(12) United States Patent
Kim et al.

(10) Patent No.: US 12,225,149 B2
(45) Date of Patent: Feb. 11, 2025

(54) ELECTRONIC DEVICE COMPRISING ANTENNA

(71) Applicant: Samsung Electronics Co., Ltd., Gyeonggi-do (KR)

(72) Inventors: Jaehyung Kim, Gyeonggi-do (KR); Minseok Park, Gyeonggi-do (KR); Sangmin Han, Gyeonggi-do (KR)

(73) Assignee: Samsung Electronics Co, Ltd., Suwon-si (KR)

( * ) Notice: Subject to any disclaimer, the term of this patent is extended or adjusted under 35 U.S.C. 154(b) by 434 days.

(21) Appl. No.: 17/675,082

(22) Filed: Feb. 18, 2022

(65) Prior Publication Data
US 2022/0174139 A1    Jun. 2, 2022

Related U.S. Application Data

(63) Continuation of application No. PCT/KR2020/011148, filed on Aug. 21, 2020.

(30) Foreign Application Priority Data

Aug. 21, 2019   (KR) .................. 10-2019-0102330

(51) Int. Cl.
*H01Q 5/30*    (2015.01)
*H01Q 1/38*    (2006.01)
(Continued)

(52) U.S. Cl.
CPC ............ *H04M 1/0266* (2013.01); *H01Q 1/38* (2013.01); *H01Q 5/357* (2015.01)

(58) Field of Classification Search
CPC . H01Q 5/35; H01Q 5/30; H01Q 11/12; H01Q 25/00; H01Q 5/328; H01Q 9/04;
(Continued)

(56) References Cited

U.S. PATENT DOCUMENTS 9,961,173 B2   5/2018   Xue et al.
10,205,225 B2  2/2019   Ha et al.
(Continued)

FOREIGN PATENT DOCUMENTS

CN   204424425 U   6/2015
CN   106299679 B   6/2019
(Continued)

OTHER PUBLICATIONS

Korean Notice of Allowance dated Aug. 3, 2023.

*Primary Examiner* — Tu X Nguyen
(74) *Attorney, Agent, or Firm* — Cha & Reiter, LLC

(57) ABSTRACT

An electronic device according to an embodiment may include a housing including a first plate, a second plate, and a side member; a window; a display panel; a PCB; a rear structure including a first area and a second area adjacent to a first edge; an antenna structure including a conductive pattern including first, second, and third points. The conductive pattern may include a first conductive pattern extending with a first length from the first point in a first direction, disposed to surround at least a portion of the first area, and including the second point, a second conductive pattern extending with a second length from the first point in a second direction and including the third point electrically connected to the ground of the PCB, and a third conductive pattern arranged inside the first area Other embodiments may also be possible.

18 Claims, 12 Drawing Sheets

(51) Int. Cl.
*H01Q 5/357* (2015.01)
*H04M 1/02* (2006.01)

(58) Field of Classification Search
CPC .......... H01Q 21/00; H01Q 7/00; H01Q 21/06;
H01Q 13/10; H01Q 5/10; H01Q 13/16;
H01Q 19/08; H01Q 19/185; H01Q 21/16;
H04B 7/04; H04M 1/725; H04M 1/03;
H04M 1/04
See application file for complete search history.

(56) References Cited

U.S. PATENT DOCUMENTS

| | | |
|---|---|---|
| 10,230,154 B2 | 3/2019 | Jeon et al. |
| 10,498,038 B2 | 12/2019 | Ha et al. |
| 10,547,099 B2 | 1/2020 | Park et al. |
| 10,700,416 B2 | 6/2020 | Jung et al. |
| 10,707,559 B2 | 7/2020 | Son et al. |
| 10,826,159 B2 | 11/2020 | Kim et al. |
| 11,024,947 B2 | 6/2021 | Jung et al. |
| 11,043,734 B2 | 6/2021 | Ha et al. |
| 11,600,905 B2 | 3/2023 | Ha et al. |
| 2015/0070219 A1 | 3/2015 | Dinh et al. |
| 2017/0201010 A1* | 7/2017 | Kim ................ H01Q 1/243 |
| 2017/0244168 A1 | 8/2017 | Wolf |
| 2018/0277936 A1 | 9/2018 | Dinh et al. |
| 2021/0041926 A1* | 2/2021 | Park ................ G06F 1/203 |

FOREIGN PATENT DOCUMENTS

| | | |
|---|---|---|
| KR | 10-2016-0084745 A | 7/2016 |
| KR | 10-2017-0051064 A | 5/2017 |
| KR | 10-2017-0062283 A | 6/2017 |
| KR | 10-2018-0097865 A | 9/2018 |
| KR | 10-2018-0109509 A | 10/2018 |
| KR | 10-2018-0124621 A | 11/2018 |
| KR | 10-2019-0033507 A | 3/2019 |

* cited by examiner

ELECTRONIC DEVICE COMPRISING ANTENNA

CROSS-REFERENCE TO RELATED APPLICATION(S)

This application is a Continuation of International Application No. PCT/KR2020/011148, filed on Aug. 21, 2020, which claims priority to Korean Patent Application No. 10-2019-0102330, filed on Aug. 21, 2019, in the Korean Intellectual Property Office, the disclosure of which are incorporated by reference herein their entirety.

BACKGROUND

Technical Field

One or more embodiments disclosed herein generally relate to an electronic device that includes an antenna.

Description of Related Art

Electronic devices supporting wireless communication are equipped with antennas. A mobile electronic device, such as a smartphone or a tablet, may transmit and receive signals of a specific frequency range. Such an electronic device may have a metallic body disposed within the electronic device functioning as a radiator. Alternatively, the metallic body may implement the external housing of the device. For example, while the side bezel area of the smartphone is narrow, the front and rear areas of the smartphone are relatively wide such that various components such as camera, receiver, speaker, microphone, and/or home button may be disposed therein. Accordingly, in an existing electronic device such as a smartphone, antennas for supporting wireless communication, such as for cellular network, Wi-Fi, or Bluetooth, may be mainly disposed in front and rear areas.

SUMMARY

To maximize screen size in relatively small and portable devices such as smartphones, the smartphone may be designed such that its side bezel areas are narrow.

When most of the front area of the electronic device (e.g., smartphone) is implemented to maximize screen size, the electronic device's side surface, upper end, and lower end are minimized and are relatively small.

When an antenna is disposed in a narrow lower end bezel area, the efficiency of the antenna may be lowered by materials (e.g., metal) of various electronic components as well as signals used in the electronic component. Furthermore, when the antenna is disposed in the narrow lower end bezel area, the bandwidth of signals that may be transmitted and received may be reduced and signal transmission/reception performance may be degraded.

According to an embodiment, an electronic device includes a housing including a first plate, a second plate facing in a direction opposite to the first plate, and a side member surrounding a space between the first plate and the second plate and including a first edge, a window disposed in at least a portion of the first plate, a display panel, at least a portion of which is viewable through the window, a PCB disposed between the display panel and the second plate, a rear structure disposed between the PCB and the second plate, coupled to or integrated with the side member, and including a first area and a second area that are adjacent to the first edge, an antenna structure disposed on the rear structure, wherein the antenna structure includes a conductive pattern including a first point, a second point, and a third point, wherein the conductive pattern includes a first conductive pattern extending in a first direction that is parallel to the first edge while having a first length from the first point, disposed to surround at least a portion of the first area, and including the second point, a second conductive pattern extending in a second direction that is opposite to the first direction while having a second length that is smaller than the first length from the first point, and including the third point electrically connected to a ground of the PCB, and a third conductive pattern disposed in the first area, having a third length that is smaller than the first length from the first point, and disposed to generate coupling with at least a portion of the first conductive pattern, a first switching circuit disposed on a path between the second point and the ground, and a wireless communication circuit electrically connected to the conductive pattern, and that transmits and/or receives a first signal of a first frequency range and a second signal of a second frequency range that is higher than the first frequency range.

According to another embodiment, an electronic device includes a housing including a first plate, a second plate facing in a direction opposite to the first plate, and a side member surrounding a space between the first plate and the second plate and including a first edge, a window disposed in at least a portion of the first plate, a display panel, at least a portion of which is viewable through the window, a PCB disposed between the display panel and the second plate, a rear structure disposed between the PCB and the second plate, coupled to or integrated with the side member, and including a first area and a second area that are adjacent to the first edge, an antenna structure disposed on the rear structure, wherein the antenna structure includes a conductive pattern including a first point, a second point, and a third point, wherein the conductive pattern includes a first conductive pattern having a first length from the first point, extending in a first direction, and including the second point, a second conductive pattern having a second length that is smaller than the first length from the first point, extending in a second direction that is opposite to the first direction, and including the third point electrically connected to a ground of the PCB, and a third conductive pattern extending from the first point to have a third length that is shorter than the first length, and a wireless communication circuit electrically connected to the first point, and that transmits and/or receives a first signal of a first frequency range and a second signal of a second frequency range that is higher than the first frequency range, and a first distal end of the first conductive pattern, a second distal end of the second conductive pattern, and a third distal end of the third conductive pattern are located to be spaced apart from the first edge, the first conductive pattern includes a first part spaced apart from the first edge by a first interval, and a second part spaced apart from the first edge by a second interval that is smaller than the first interval, and the third conductive pattern is disposed in the first area between the first edge and the first part of the first conductive pattern.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

With regard to description of drawings, the same or similar components may be marked by the same or similar reference numerals.

DETAILED DESCRIPTION

Hereinafter, certain embodiments of the disclosure will be described with reference to the accompanying drawings. Accordingly, those of ordinary skill in the art will recognize that modification, equivalent, and/or alternative on the various embodiments described herein can be variously made without departing from the scope and spirit of the disclosure.

According to an embodiment of the disclosure, radiation performance of an antenna may be improved even though the antenna is disposed in a lower end bezel area of an electronic device.

According to embodiments of the disclosure, even though the antenna is disposed in a lower end bezel area of an electronic device, the frequency band of signals that are transmitted and received by the antenna may still have relatively wide bandwidth.

Figure 1:
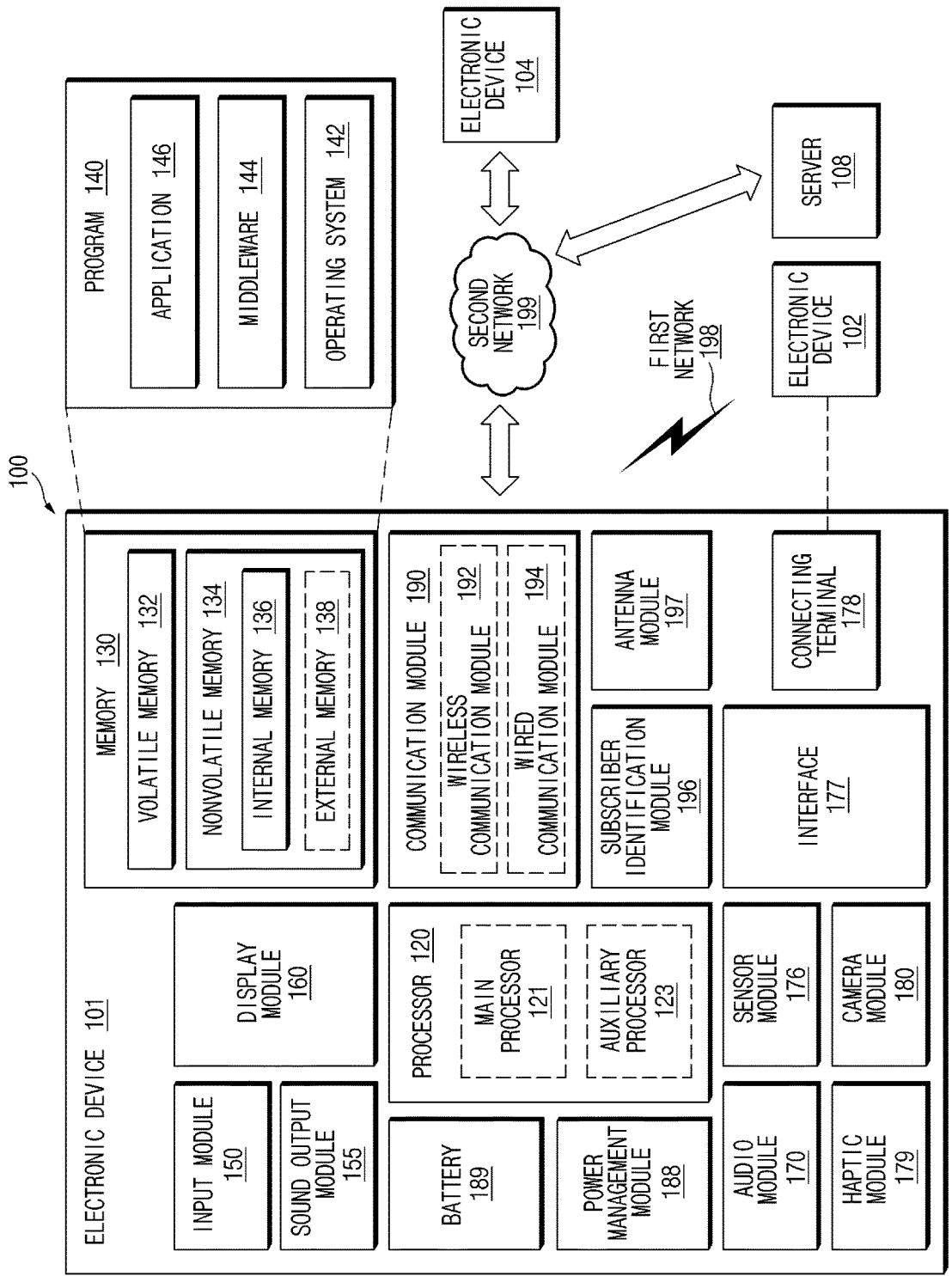
FIG. 1 is a block diagram of an electronic device in a network environment according to an embodiment of the disclosure.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
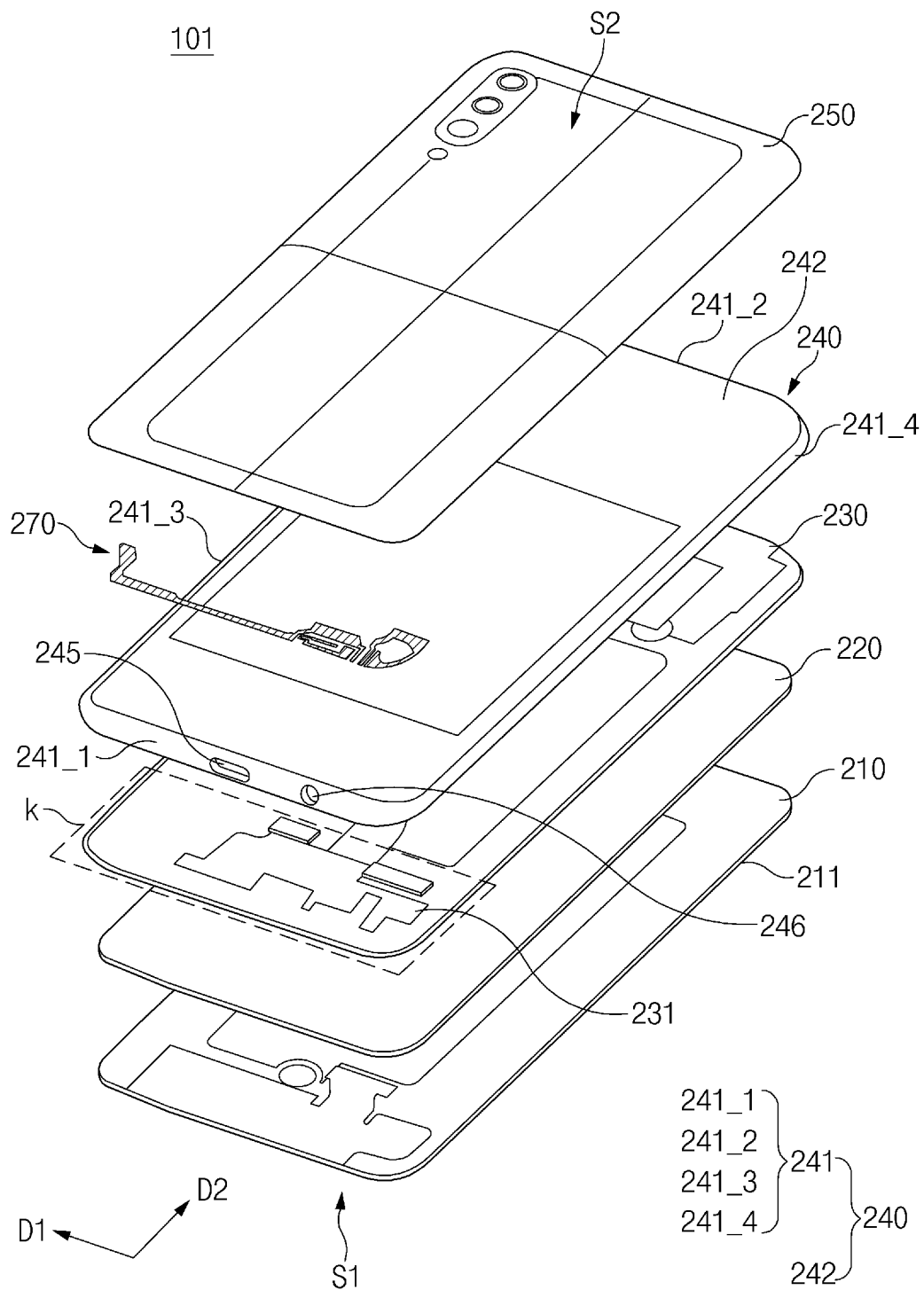
FIG. 2 is an exploded perspective view illustrating an electronic device according to an embodiment of the disclosure.
Figure 3:
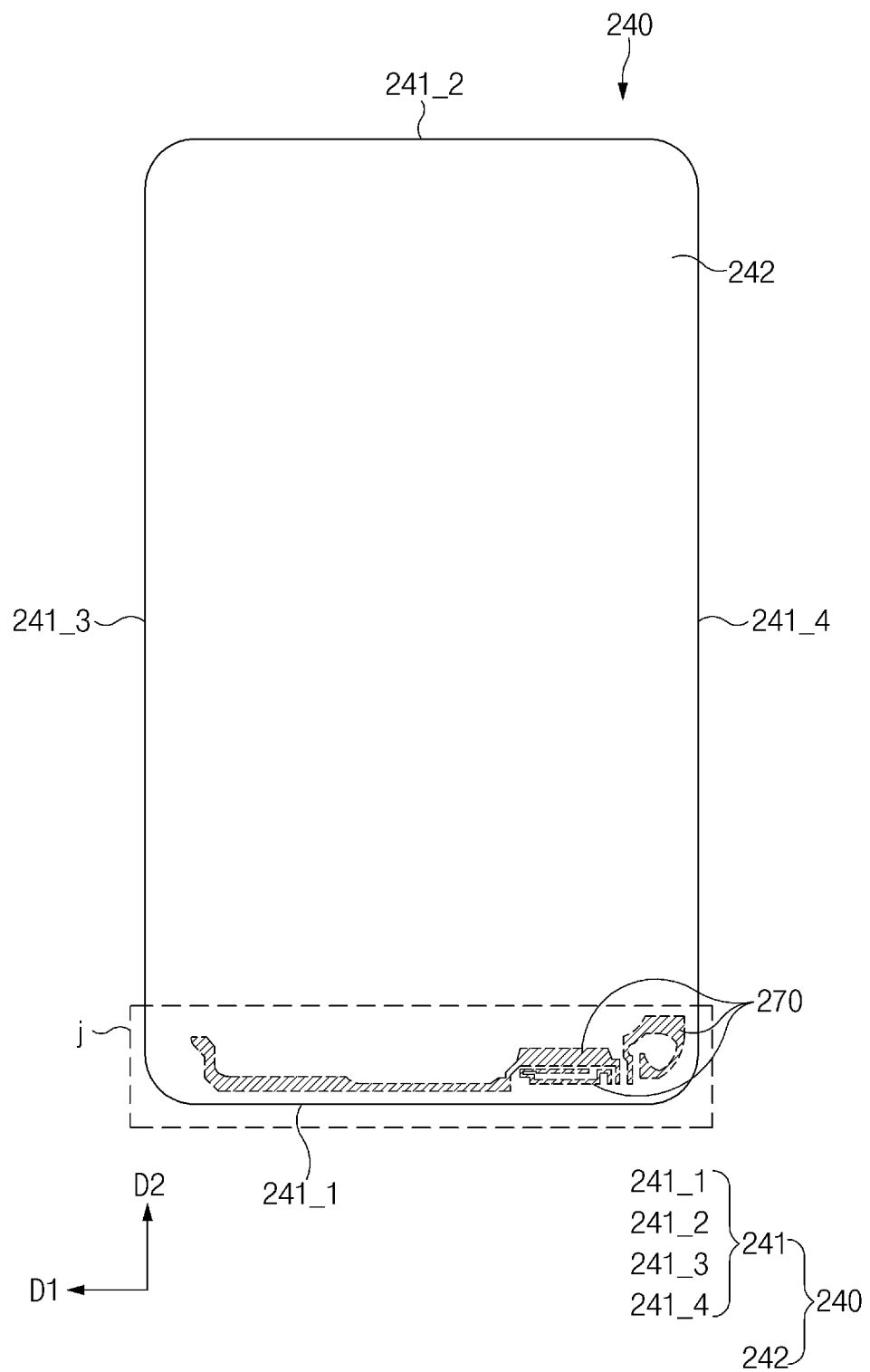
FIG. 3 is a view illustrating a rear structure of an electronic device according to an embodiment of the disclosure.

FIG. 2 is an exploded perspective view illustrating the electronic device 101 according to an embodiment of the disclosure. FIG. 3 is a view illustrating a rear structure 240 of the electronic device 101 according to an embodiment of the disclosure. FIG. 3 is a view of the rear structure 240, viewed from the second surface S2.

Referring to FIG. 2, in an embodiment, the electronic device 101 may include a window 210, a display panel 220, a support member 230, the rear structure 240, and an antenna structure 270 (e.g., the antenna module 197 of FIG. 1) and/or a second plate 250. The housing of the electronic device 101 may include a first plate 211, the second plate 250, and a side member 241. The first plate 211 may include a first surface S1. The second plate 250 may face a direction opposite to the first plate 211. The second plate 250 may include the second surface S2. The side member 241 may surround the space between the first plate 211 and the second plate 250. The window 210 may define at least a portion of the first plate 211.

The electronic device 101, for example, may be a smartphone, a tablet, a wearable device, a home appliance, or a digital camera.

According to an embodiment, at least a portion of the first plate 211 may include the transparent window 210. The first plate 211, for example, may be the front surface of the electronic device 101. The display panel 220 of the electronic device 101, for example, may be disposed through the first plate 211. The second plate 250, for example, may be the rear surface of the electronic device 101. A rear camera of the electronic device 101, for example, may be disposed in the second plate 250.

According to an embodiment, the window 210 may define at least a portion of the first plate 211. The window 210, for example, may be implemented by a glass plate or a polymer plate including various coating layers.

According to an embodiment, the display panel 220 may be disposed between the window 210 and the second plate 250. At least a portion of the display panel 220 may be exposed through the window 210. In an embodiment, the shape of the corners of the display panel 220 may be substantially the same as that of the adjacent outer edge of the window 210. In an embodiment, to maximize the exposed area of the display panel 220, the interval between the outskirt of the display panel 220 and the outskirt of the window 210 may be substantially the same. The display panel 220 may be connected to a processor (e.g., the processor 120 of FIG. 1) of the electronic device 101. The display panel 220 may receive image data from the processor and may display images corresponding to the image data from the processor.

According to an embodiment, the support member 230 may be disposed between the display panel 220 and the second plate 250. At least a portion of the support member 230, for example, may be made of a metallic material and/or a polymer material. The support member 230 may define at least a portion of the mounting structure for components included in the electronic device 101.

According to an embodiment, a printed circuit board (PCB) 231 may be disposed on the support member 230. The PCB 231, for example, may be disposed between the display panel 220 and the support member 230.

According to an embodiment, the processor (e.g., the processor 120 of FIG. 1) may be disposed on the PCB 231. The processor, for example, may be a central processing unit, an application processor, a graphic processing unit, an image signal processor, a sensor hub processor, and/or a communication processor, etc.

According to an embodiment, a wireless communication circuit may be disposed on the PCB 231. The wireless communication circuit, for example, may perform communication with an external device (e.g., the electronic device 104 of FIG. 1).

According to an embodiment, the PCB 231 may include a ground. The ground of the PCB 231 may function as the ground of the antenna structure 270 that is implemented by using the wireless communication circuit.

According to an embodiment, the rear structure 240 may be disposed between the support member 230 and the second plate 250. In an embodiment, the rear structure 240 may include the side member 241 and the internal member 242. The side member 241 may implement at least a portion of the side surface of the electronic device 101. The internal member 242 may be interposed between the second plate 250 and the support member 230. The side member 241 and the internal member 242 may be connected to each other. The rear structure 240 may be coupled to or integrated with the side member 241. Referring to FIGS. 2 and 3, the side member 241 may include a first edge 241_1, a second edge 241_2, a third edge 241_3, and/or a fourth edge 241_4.

According to an embodiment, the first edge 241_1 may extend in a first direction D1, and may define the lower end of the electronic device 101. The second edge 241_2 may face the first edge 241_1, and may extend in the first direction D1. The second edge 241_2 may define the upper end of the electronic device 101. The third edge 241_3 may extend in a second direction D2 perpendicular the first direction D1, and may connect the first edge 241_1 and the second edge 241_2. The fourth edge 241_4 may face the third edge 241_3, and may extend in the second direction D2. The fourth edge 241_4 may connect the first edge 241_1 and the second edge 241_2.

In an embodiment, a hole that may accommodate a connector 245 (e.g., USB connector) for transmitting and receiving electric power and/or data to and from an external device may be formed in the first edge 241_1. In an embodiment, the hole that may accommodate a connector 246 (e.g., audio connector) for transmitting and receiving audio signals to and from an external device may be formed in the first edge 241_1. In an embodiment, a key input device that may be pressed by a user may be disposed in the third edge 241_3 and the fourth edge 241_4 (not shown).

According to an embodiment, the first edge 241_1, the second edge 241_2, the third edge 241_3, and/or the fourth edge 241_4 may include a nonconductive material.

In an embodiment, the internal member 242 may include at least one opening (not illustrated). Due to the opening of the internal member 242, some of the components mounted on the support member 230 may be exposed.

According to an embodiment, the antenna structure 270 may be disposed on the rear structure 240. For example, the antenna structure 270 may be interposed between the rear structure 240 and the second plate 250. As another example, the antenna structure 270 may be coupled to the rear structure 240. In an embodiment, the antenna structure 270 may be disposed to be closer to the first edge 241_1 than to the second edge 241_2. As another example, the antenna structure 270 may be disposed to be spaced apart from the first edge 241_1.

In an embodiment, at least a portion of the antenna structure 270 may be made of a flexible material. For example, at least a portion of the antenna structure 270 may be implemented by a flexible printed circuit board (FPCB). The antenna structure 270 may radiate a first signal of a first frequency range and a second signal of a second frequency range.

In an embodiment, the second plate 250 may cover the rear structure 240 and the antenna structure 270 coupled to the rear structure 240, but at least a portion of the side member 241 may be exposed.

Figure 4:
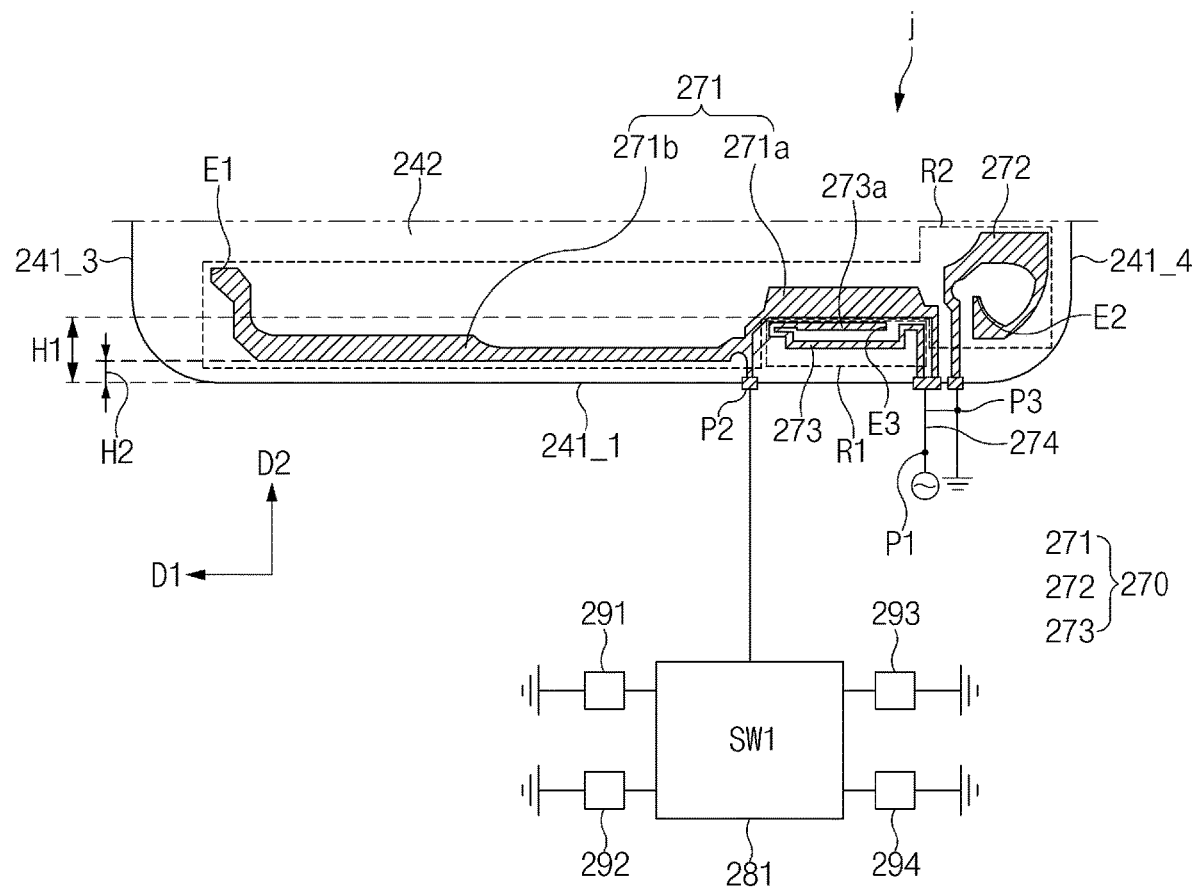
FIG. 4 is a view illustrating an antenna structure included in an electronic device according to an embodiment of the disclosure, and is an enlarged view of area "j" of FIG. 3.

FIG. 4 is a view illustrating the antenna structure 270 included in the electronic device 101 according to an embodiment of the disclosure, and is an enlarged view of area "j" of FIG. 3. FIG. 4 is a view illustrating that the antenna structure 270 is coupled to the rear structure 240.

Referring to FIG. 4, the antenna structure 270 according to the embodiment of the disclosure may include a conductive pattern including a first point P1, a second point P2, and a third point P3. The conductive pattern may include a first conductive pattern 271, a second conductive pattern 272, and/or a third conductive pattern 273. According to an embodiment, the first conductive pattern 271, the second conductive pattern 272, and/or the third conductive pattern 273 may extend from the first point P1. The third conductive pattern 273 may be disposed in a first area R1, and the first conductive pattern 271 and the second conductive pattern 272 may be disposed in a second area R2. The first area R1 and the second area R2 may be areas included on a surface of the rear structure 240, which faces the second surface S2.

In an embodiment, the first length of the conductive pattern 271 may be larger than the second length of the second conductive pattern 272 and the third length of the third conductive pattern 273.

In an embodiment, at least a portion of the first conductive pattern 271 may extend from the first point P1 in the first direction D1. The first direction D1, for example, may be parallel to the first edge 241_1. The first point P1 may be the point at which the first conductive pattern 271 starts, when the antenna structure 270 coupled to the rear structure 240 is viewed from the second surface S2 of the electronic device 101. The first conductive pattern 271 may include a first distal end E1. The first distal end E1 may be the point at which the first conductive pattern 271 ends. In an embodiment, the first distal end E1 may be located closer to the third edge 241_3 than to the fourth edge 241_4. The first distal end E1 may be located to be spaced apart from the side member 241. For example, the first distal end E1 may not directly contact the side member 241. For example, the first distal end E1 may be located to be spaced apart from the first edge 241_1 and the third edge 241_3.

According to an embodiment, the first conductive pattern 271 may surround at least a portion of the first area R1. According to an embodiment, the first conductive pattern 271 may include a first part 271a and a second part 271b. The first part 271a may be a part of the first conductive pattern 271 that is spaced apart from the first edge 241_1 by a first interval H1 in the second direction D2. The second part 271b may be a part of the first conductive pattern 271 that is spaced apart from the first edge 241_1 by a second interval H2 in the second direction D2. The first interval H1 may be larger than the second interval H2. For example, the first area R1 may be an area between the first edge 241_1 and the first part 271a.

According to an embodiment, the second point P2 may be a point on the first conductive pattern 271 that is different from the first point P1 and is spaced apart from the first point P1. The second point P2 may be a point that is located at the border between the first part 271a and the second part 271b. For example, the first part 271a may be a part of the first conductive pattern 271 between the first point P1 and the second point P2.

According to an embodiment, the second conductive pattern 272 may be disposed to be spaced apart from the first conductive pattern 271 when the rear structure 240 is viewed from the second surface S2. The first conductive pattern 271 and the second conductive pattern 272 may be connected to each other when the rear structure 240 is viewed from the first surface S1. That is, the connecting portion connecting the first conductive pattern 271 and the second conductive pattern 272 may not be visible when viewed from the second surface S2. The first conductive pattern 271 and the second conductive pattern 272 may be electrically connected to each other. The second conductive pattern 272 may be disposed to be closer to the fourth edge 241_4 than to the first conductive pattern 271.

In an embodiment, at least a portion of the second conductive pattern 272 may extend from the first point P1 in a direction opposite to the first direction D1. The second conductive pattern 272 may include the third point P3 that is electrically connected to the ground of the PCB 231. The second conductive pattern 272 may include a second distal end E2. The second distal end E2 may be the point at which the second conductive pattern 272 ends. In an embodiment, the second distal end E2 may be located closer to the fourth edge 241_4 than to the third edge 241_3. The second distal end E2 may be located to be spaced apart from the side member 241. For example, the second distal end E2 may not directly contact the side member 241. For example, the second distal end E2 may be located to be spaced apart from the first edge 241_1 and the fourth edge 241_4.

According to an embodiment, the third conductive pattern 273 may be disposed to be spaced apart from the first conductive pattern 271 and the second conductive pattern 272 when the rear structure 240 is viewed from the second surface S2. The first conductive pattern 271, the second conductive pattern 272, and the third conductive pattern 273 may be connected to each other when the rear structure 240 is viewed from the first surface S1. The first conductive pattern 271, the second conductive pattern 272, and the third conductive pattern 273 may be electrically connected to each other. The third conductive pattern 273 may be disposed between the first point P1 and the second point P2 of the first conductive pattern 271. The third conductive pattern 273 may be disposed in the first area R1 between the first part 271a of the first conductive pattern 271 and the first edge 241_1.

In an embodiment, at least a portion of the third conductive pattern 273 may extend from the first point P1. The third conductive pattern 273 may include a third distal end E3. The third distal end E3 may be the point at which the third conductive pattern 273 ends. The third distal end E3 may be located to be spaced apart from the side member 241. For example, the third distal end E3 may not directly contact the side member 241. For example, the third distal end E3 may be located to be spaced apart from the first edge 241_1, the third edge 241_3, and the fourth edge 241_4.

According to an embodiment, a part 273a of the third conductive pattern 273 may be disposed to generate coupling (e.g. capacitive coupling) with at least a portion of the first conductive pattern 271. For example, the part 273a of the third conductive pattern 273 may be disposed to generate coupling with the first part 271a of the first conductive pattern 271.

The first distal end E1, the second distal end E2, and the third distal end E3 of the antenna structure 270, which is disposed adjacent to the first edge 241_1 and coupled to the rear structure 240, may be spaced apart from the first edge 241_1, the third edge 241_3, and the fourth edge 241_4 for the stable arrangement of the antenna structure, which is required because the antenna structure is implemented with the FPCB and is flexible.

According to an embodiment, portions of the first conductive pattern 271, the second conductive pattern 272, and the third conductive pattern 273 may merge into a common portion 274. The common portion 274, for example, may be a part that extends from the first point P1 in the second direction D2.

In an embodiment, the electronic device 101 may be implemented to radiate electromagnetic waves for wireless communication by using the antenna structure 270. The first conductive pattern 271 may operate in a frequency band that is different from the frequency bands of the second conductive pattern 272 and the third conductive pattern 273.

Figure 5:
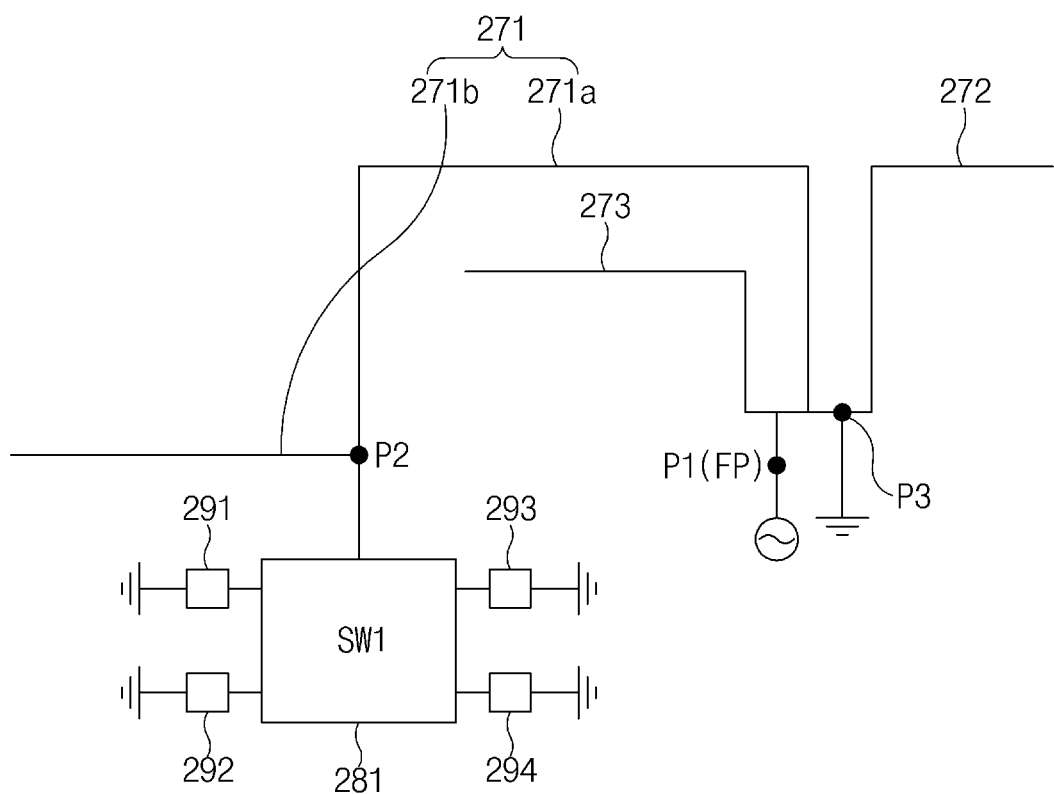
FIG. 5 is a circuit diagram corresponding to an antenna structure according to an embodiment of the disclosure.
Figure 6:
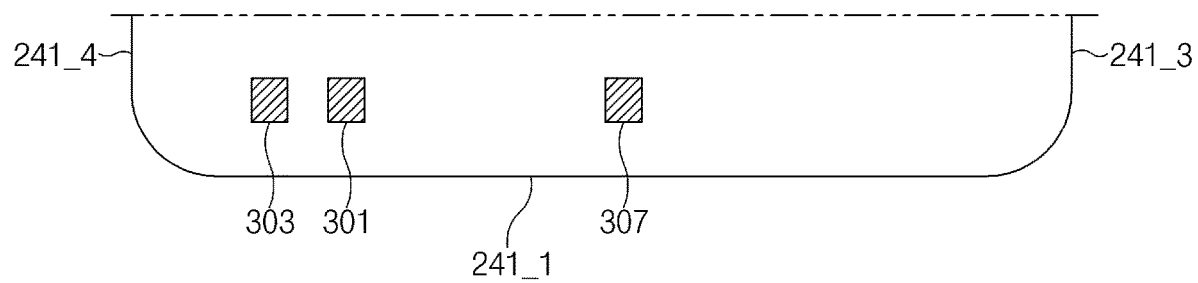
FIG. 6 is a view of a rear structure of FIG. 2, viewed from a first surface.
Figure 7:
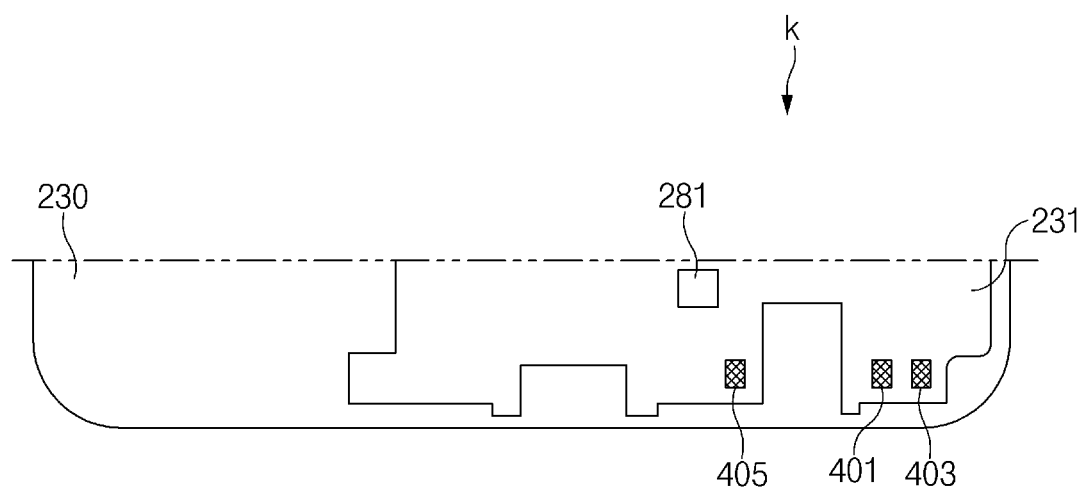
FIG. 7 is an enlarged view of area "k" of FIG. 2.
Figure 8:
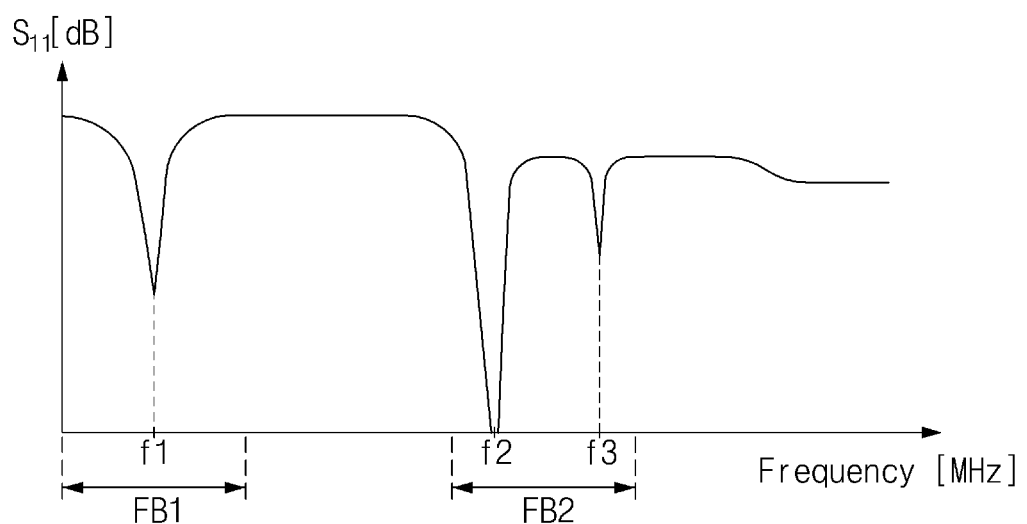
FIG. 8 is a graph depicting signals transmitted and received by a wireless communication circuit by using an antenna structure of an electronic device according to an embodiment of the disclosure.
Figure 9:
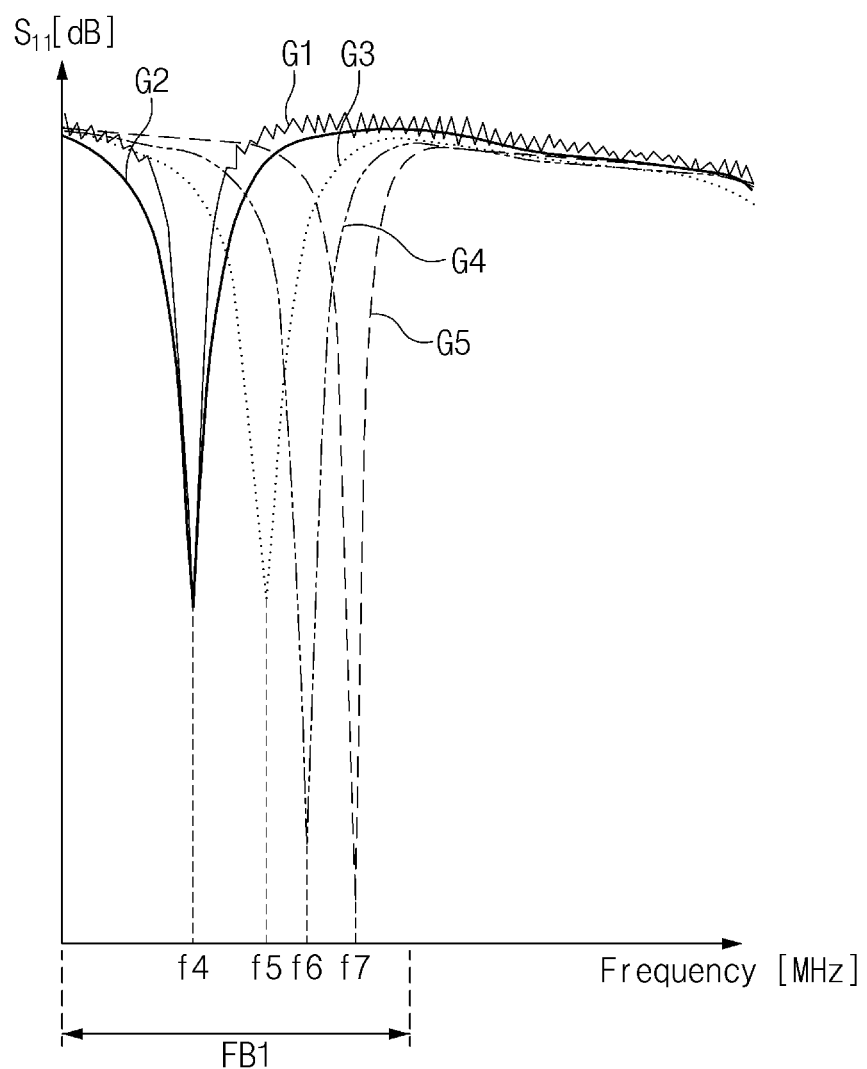
FIG. 9 is a graph depicting signals transmitted and received by a wireless communication circuit by using an antenna structure of an electronic device according to an embodiment of the disclosure.

FIG. 5 is a circuit diagram corresponding to the antenna structure 270 according to an embodiment of the disclosure. FIG. 6 is a view of the rear structure 240 of FIG. 2, viewed from the first surface S1. FIG. 7 is an enlarged view of area "k" of FIG. 2. FIG. 8 is a graph depicting signals transmitted and received by a wireless communication circuit by using the antenna structure 270 of the electronic device 101 according to an embodiment of the disclosure. FIG. 9 is a graph depicting signals transmitted and received by a wireless communication circuit by using the antenna structure 270 of the electronic device 101 according to an embodiment of the disclosure.

Referring to FIGS. 2, 4, and 5, the first conductive pattern 271, the second conductive pattern 272, and/or the third conductive pattern 273 of the antenna structure 270 may be connected to the ground of the PCB 231. Furthermore, the first conductive pattern 271, the second conductive pattern 272, and/or the third conductive pattern 273 may be connected to the wireless communication circuit through a feeding point FP.

According to an embodiment, a first switching circuit 281 may be connected to the second point P2. The first switching circuit 281 may be connected to the second point P2 and the ground of the PCB 231 through a plurality of elements 291, 292, 293, and 294. In an embodiment, the first switching circuit 281 may connect the second point P2 of the first conductive pattern 271 to the ground of the PCB 231 through any one of the four elements 291, 292, 293, and 294. However, the disclosure is not limited thereto, but the first switching circuit 281 may connect the second point P2 of the first conductive pattern 271 to the ground of the PCB 231 through an arbitrary number of elements.

In an embodiment, the four elements 291, 292, 293, and 294 may be capacitors and/or inductors.

Referring to FIGS. 6 and 7, the rear structure 240 may include a front surface that faces the first surface S1, and a rear surface, to which the antenna structure 270 is coupled, and that faces the second surface S2. FIG. 6 is a view illustrating the front surface of the rear structure 240. Area "k" of FIG. 7 may face the rear surface of the rear structure 240.

The antenna structure 270 may include a first pad 301, a second pad 303, or a third pad 307. In an embodiment, the first pad 301, the second pad 303, and the third pad 307 may be connected to a portion of the antenna structure 270, and are exposed to the front side of the rear structure 240 after passing through the rear structure 240. To allow the portion of the antenna structure 270 to pass through the rear structure 240, the rear structure 240 may include one or more openings (not illustrated). The portion of the antenna structure 270 may pass through the rear structure 240 to contact the rear structure 240.

According to an embodiment, the PCB 231 may include a fourth pad 401, a fifth pad 403, and/or a sixth pad 405. The fourth pad 401 may be connected to the wireless communication circuit disposed in the PCB 231. The fifth pad 403 may be connected to the ground of the PCB 231. The sixth pad 405 may be connected to the first switching circuit 281 disposed in the PCB 231. In an embodiment, the fourth pad 401, the fifth pad 403, and the sixth pad 405 may be electrically connected to the first pad 301, the second pad 303, and the third pad 307, respectively, by a connection member (e.g., a C-clip).

According to an embodiment, the feeding point FP may be connected to the first pad 301. The first pad 301 may be connected to the fourth pad 401 of the PCB 231. For example, the feeding point FP may be electrically connected to the wireless communication circuit of the PCB 231 through the first pad 301 and the fourth pad 401.

According to an embodiment, the third point P3 of the antenna structure 270 may be connected to the second pad 303. The second pad 303 may be connected to the fifth pad 403 of the PCB 231. For example, the third point P3 may be electrically connected to the ground of the PCB 231 through the second pad 303 and the fifth pad 403.

According to an embodiment, the second point P2 of the antenna structure 270 may be connected to the third pad 307. The third pad 307 may be connected to the sixth pad 405 of the PCB 231. For example, the second point P2 may be electrically connected to the first switching circuit 281 of the PCB 231 through the third pad 307 and the sixth pad 405.

Referring to FIG. 5, the wireless communication circuit may feed electric power to the first conductive pattern 271, the second conductive pattern 272, and the third conductive pattern 273, through the feeding point FP.

Referring to FIGS. 5 and 8, the "x" axis of FIG. 8 may represent frequency (unit: MHz), and the "y" axis may represent reflectivity S11 (unit: dB). The graph of FIG. 8 represents signals that may be transmitted and/or received by the antenna structure 270 when electric power is fed to the antenna structure 270 by the wireless communication circuit.

According to an embodiment, the first frequency range FB1 may include a first resonance frequency f1. The second frequency range FB2 may include a second resonance frequency f2 and a third resonance frequency D. A second frequency range FB2 may be higher than the first frequency range FB1.

According to an embodiment, when the wireless communication circuit feeds electric power to the first conductive pattern 271, the second conductive pattern 272, and the third conductive pattern 273 through the feeding point FP, a first electrical path for transmitting and/or receiving a first signal of the first frequency range FB1 may include the first conductive pattern 271. The wireless communication circuit may transmit and/or receive the first signal of the first frequency range FB1, based on the first electrical path. The first signal having the first resonance frequency f1 may be transmitted and/or received by using the first conductive pattern 271.

According to an embodiment, when the wireless communication circuit feeds electric power to the first conductive pattern 271, the second conductive pattern 272, and the third conductive pattern 273 through the feeding point FP, a second electrical path for transmitting and/or receiving a second signal of the second frequency range FB2 may include the second conductive pattern 272 and the third conductive pattern 273. The wireless communication circuit may transmit and/or receive the second signal of the second frequency range FB2, based on the second electrical path. The second signal of the second frequency range FB2 may include a signal having the second resonance frequency f2 and a signal having the third resonance frequency f3. The signal having the second resonance frequency f2 in the second frequency range FB2 may be transmitted and/or received by using the second conductive pattern 272. The signal having the third resonance frequency f3 in the second frequency range FB2 may be transmitted and/or received by using the third conductive pattern 273.

According to an embodiment, when the wireless communication circuit feeds electric power to the first conductive pattern 271, the second conductive pattern 272, and the third conductive pattern 273 through the feeding point FP to transmit and receive the first signal and the second signal, the resonance frequency in the first frequency range FB1 may be adjusted by the first switching circuit 281.

Referring to FIGS. 5 and 9, the "x" axis of FIG. 9 may represent frequency (unit: MHz), and the "y" axis may represent reflectivity S11 (unit: dB). The first to fifth graphs G1, G2, G3, G4, and G5 of FIG. 9 represent signals that may be transmitted and/or received through the antenna structure 270 by the wireless communication circuit when electric power is fed to the antenna structure 270 by the wireless communication circuit.

For example, when the first switching circuit 281 is electrically connected the second point P2 and to the ground of the PCB 231 through at least one of the first to fourth elements 291, 292, 293, and 294, the wireless communication circuit may transmit and/or receive a signal having any one of fourth to seventh resonance frequencies f4, f5, f6, and f7 in the first frequency range FB1. In this case, the first signal may be a signal having any one of the fourth to seventh resonance frequencies f4, f5, f6, and f7. For example, the first resonance frequency f1 of FIG. 8 may be any one of the fourth to seventh resonance frequencies f4, f5, f6, and f7.

For example, when the first switching circuit 281 does not connect the second point P2 to the ground of the PCB 231 (e.g., the first graph G1 and the second graph G2), the first signal may have the fourth resonance frequency f4.

In an embodiment, when the first switching circuit 281 electrically connects the second point P2 to the ground of the PCB 231 through an inductor and a capacitor implementing one of the first to fourth elements 291, 292, 293, and 294 (e.g., the third graph G3), the wireless communication circuit may transmit and/or receive a signal having the fifth resonance frequency f5 that is higher than the first resonance frequency f1 by using the first conductive pattern 271.

In an embodiment, when the first switching circuit 281 electrically connects the second point P2 to the ground of the PCB 231 through an inductor implementing one of the first to fourth elements 291, 292, 293, and 294 (e.g., the fourth graph G4 and the fifth graph G5), the wireless communication circuit may transmit and/or receive a signal having resonance frequencies (e.g., f6 and f7) that are higher than the fifth resonance frequency f5 by using the first conductive pattern 271.

According to an embodiment, the resonance frequency of the first signal that may be transmitted and/or received by the wireless communication circuit by using the first conductive pattern 271 may be adjusted according to inductances of the inductors included in the first to fourth elements 291, 292, 293, and 294 connected to the first switching circuit 281. In this case, the first switching circuit 281, for example, may be used as a matching circuit. For example, when the wireless communication circuit transmits and/or receives the first signal having the sixth resonance frequency f6 by using the first conductive pattern 271, this may be the case in which an inductor having lower inductance is connected to the first conductive pattern 271 by the first switching circuit 281 as compared with the case in which the first signal having the seventh resonance frequency f7 is transmitted and/or received by using the first conductive pattern 271. For example, as inductance values of the inductors included in the first to fourth elements 291, 292, 293, and 294 connected by the first switching circuit 281 increases, resonance frequencies may become lower.

The antenna structure 270 of the electronic device 101 according to the embodiment of the disclosure may adjust the resonance frequency by connecting the second point P2 to a suitable element through the first switching circuit 281.

According to an embodiment, to obtain a plurality of resonance frequencies (e.g., the second resonance frequency f2 and the third resonance frequency f3) in the second frequency range FB2 while obtaining high radiation efficiency of the first frequency range FB1, the third conductive pattern 273 may be disposed between the first part 271a and the first edge 241_1 (e.g., in the first area R1). The radiation efficiency when the third conductive pattern 273 is disposed between the first part 271a and the first edge 241_1 may be higher than the radiation efficiency when the third conductive pattern 273 is spaced apart from the first edge 241_1 at an interval that is larger than the first interval H1. This is because interferences with other components may occur to hinder radiation when the third conductive pattern 273 is spaced apart from the first edge 241_1 at an interval that is larger than the first interval H1.

Figure 10:
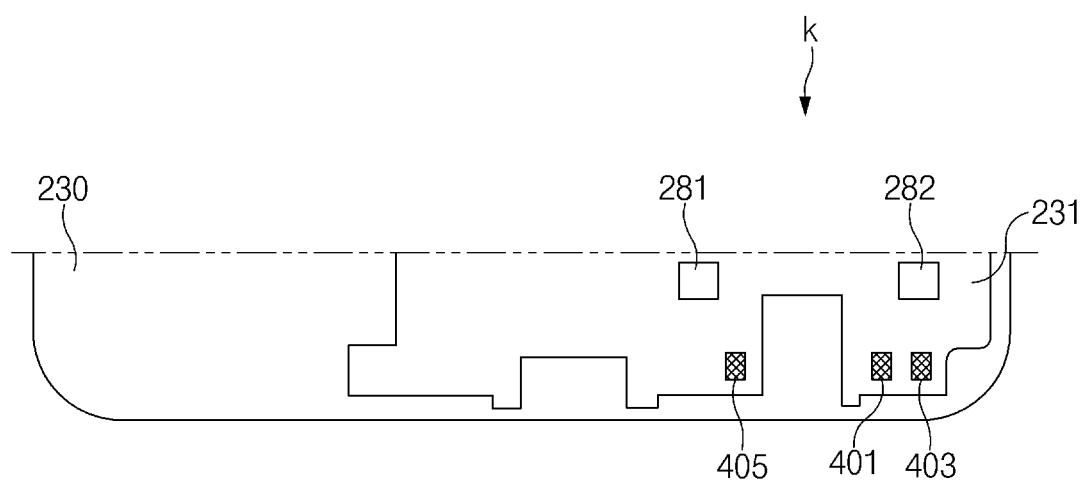
FIG. 10 is an enlarged view of area "k" of FIG. 2.
Figure 11:
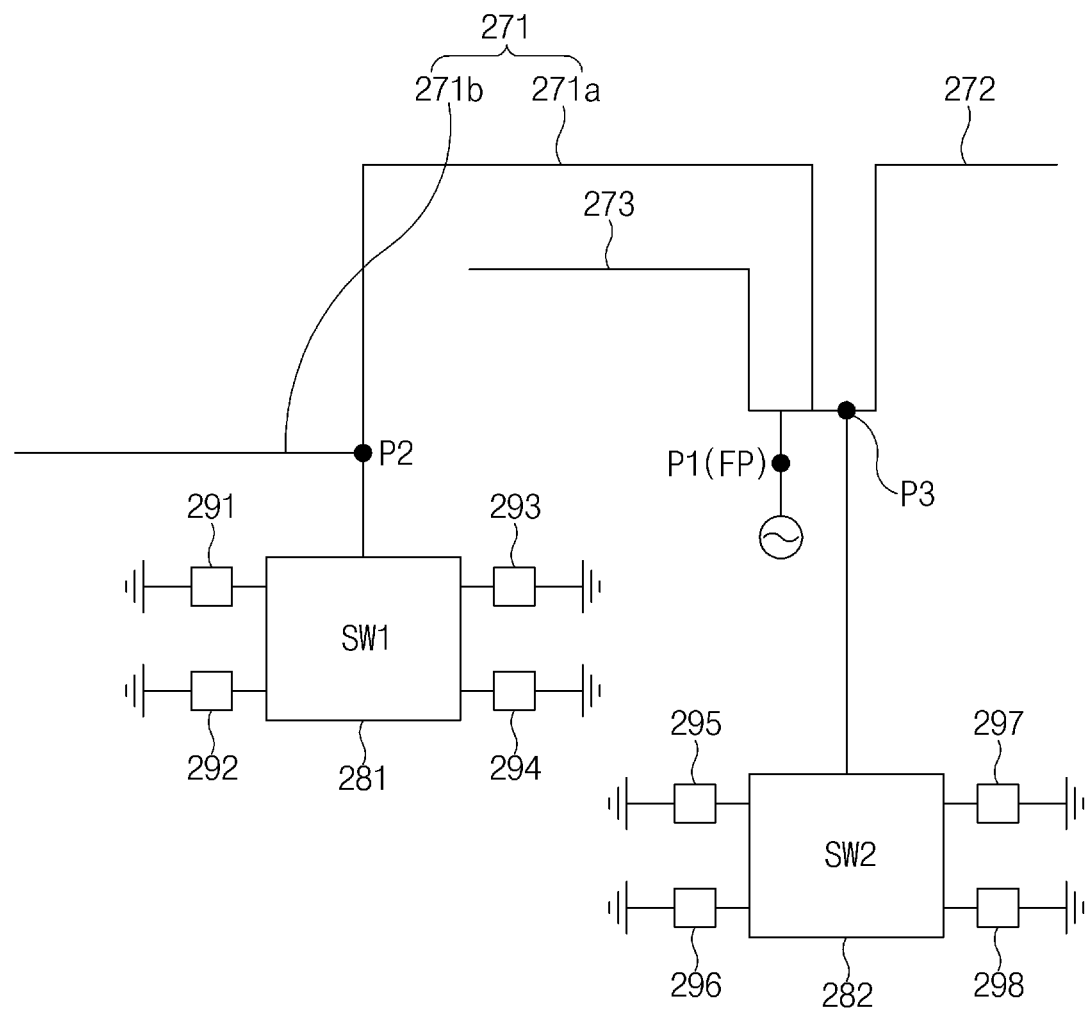
FIG. 11 is a circuit diagram corresponding to an antenna structure according to an embodiment of the disclosure.
Figure 12:
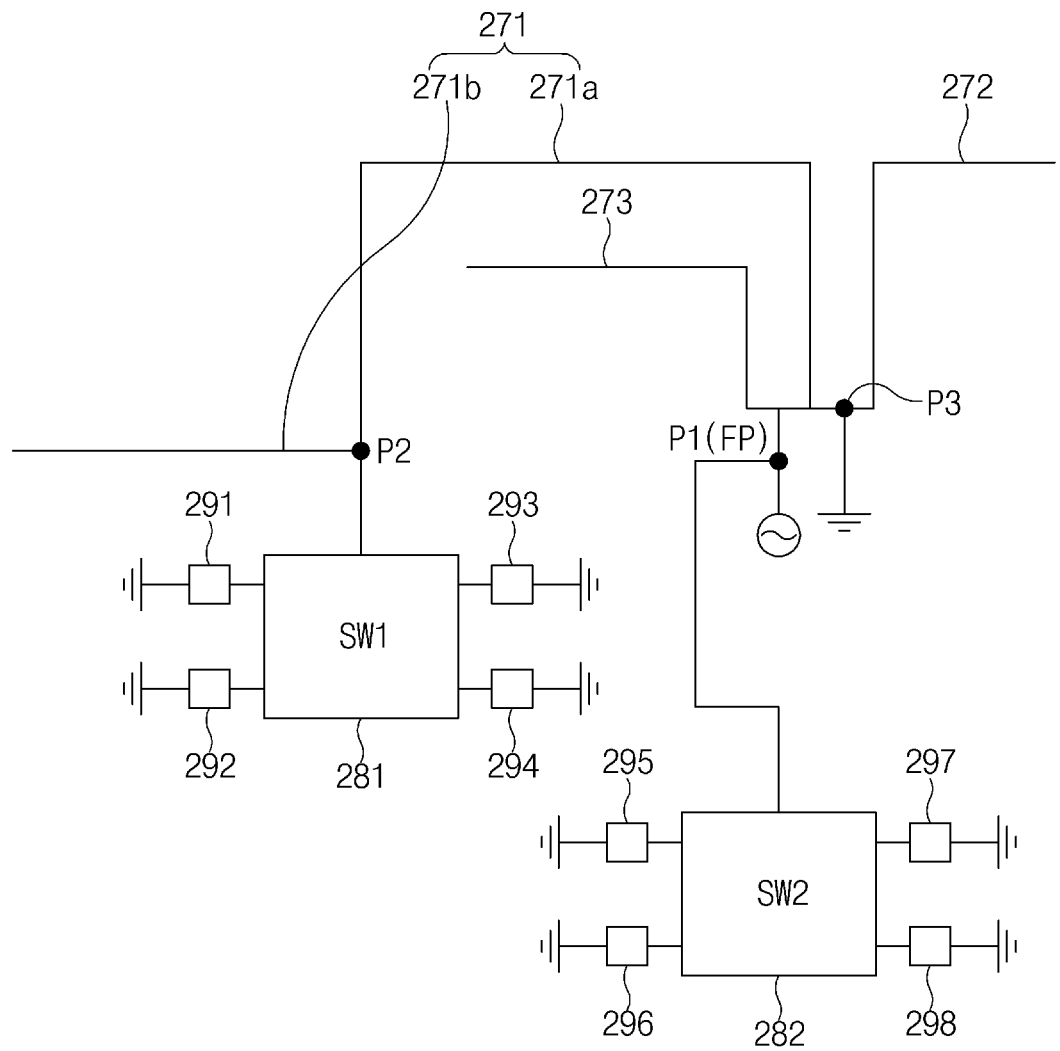
FIG. 12 is a circuit diagram corresponding to an antenna structure according to an embodiment of the disclosure.

FIG. 10 is an enlarged view of area "k" of FIG. 2. FIG. 11 is a circuit diagram corresponding to the antenna structure 270 according to an embodiment of the disclosure. FIG. 12 is a circuit diagram corresponding to the antenna structure 270 according to an embodiment of the disclosure. For clarity of description, duplicative descriptions will not be repeated.

Referring to FIG. 10, the electronic device 101 according to the embodiment of the disclosure may further include a second switching circuit 282. The second switching circuit 282 may be disposed in the PCB 231. The second switching circuit 282 may be electrically connected to at least one of the fourth pad 401 or the fifth pad 403. Description of the first switching circuit 281, other than the following description of the connection relationship between the second switching circuit 282 and the antenna structure 270, may be applied to the second switching circuit 282.

In an embodiment, referring to FIG. 11, the second switching circuit 282 may connect the first conductive pattern 271, the second conductive pattern 272, and/or the third conductive pattern 273 to the ground of the PCB 231. In another embodiment, the second switching circuit 282 may connect the first conductive pattern 271, the second conductive pattern 272, and/or the third conductive pattern 273 to the ground of the PCB 231 through a plurality of elements 295, 296, 297, and 298.

In an embodiment, referring to FIG. 12, the second switching circuit 282 may connect the feeding point FP and the ground of the PCB 231. The second switching circuit 282 may connect the feeding point FP to the ground of the PCB 231 through the plurality of elements 295, 296, 297, and 298.

According to an embodiment, the four elements 295, 296, 297, and 298 may include a capacitor and/or an inductor.

When the wireless communication circuit feeds electric power to the first conductive pattern 271, the second conductive pattern 272, and the third conductive pattern 273 through the feeding point FP to transmit and/or receive the first signal and the second signal, the resonance frequency in the second frequency range FB2 may be adjusted by the second switching circuit 282.

For example, when the second switching circuit 282 does not electrically connect the feeding point FP to the ground of the PCB through any one of the plurality of elements 295, 296, 297, and 298, the wireless communication circuit may transmit and/or receive the second signal having a reference resonance frequency by using the second conductive pattern 272 and the third conductive pattern 273.

For example, when the second switching circuit 282 electrically connects the feeding point FP to the ground of the PCB through a capacitor implementing one of the plurality of elements 295, 296, 297, and 298, the wireless communication circuit may transmit and/or receive the second signal having a resonance frequency that is lower than the reference resonance frequency by using the second conductive pattern 272 and the third conductive pattern 273.

For example, when the second switching circuit 282 electrically connects the feeding point FP to the ground of the PCB through inductor implementing one of the plurality of elements 295, 296, 297, and 298, the wireless communication circuit may transmit and/or receive the second signal having a resonance frequency that is higher than the reference resonance frequency by using the second conductive pattern 272 and the third conductive pattern 273.

In an embodiment, the resonance frequency in the first frequency range FB1 may be adjusted by the first switching circuit 281, and the resonance frequency in the second frequency range FB2 may be adjusted by the second switching circuit 282.

For example, when the first switching circuit 281 electrically connects the second point P2 to the ground of the PCB 231 through an inductor implementing one of the plurality of elements 291, 292, 293, and 294 and when the second switching circuit 282 is in an open state, the resonance frequency of the first frequency range FB1 is an eighth resonance frequency and the resonance frequencies of the second frequency range FB2 may be ninth and tenth resonance frequencies. As another example, when the first switching circuit 281 is an open state and the second switching circuit 282 electrically connects the feeding point FP to the ground of the PCB through an inductor implementing one of the plurality of elements 295, 296, 297, and 298, the resonance frequency of the first frequency range FB1 may be lower than the eighth resonance frequency and the resonance frequencies of the second frequency range FB2 may be higher than at least one of the ninth and tenth resonance frequencies.

According to certain embodiments, through a combination of the elements that may be connected to each other through the first switching circuit 281 and a combination of the elements that may be connected to each other through the second switching circuit 282, signal having various resonance frequencies in the first frequency range FB1 and the second frequency range FB2 may be transmitted and/or received.

An electronic device according to an embodiment of the disclosure includes a housing including a first plate, a second plate facing in a direction opposite to the first plate, and a side member surrounding a space between the first plate and the second plate and including a first edge, a window disposed in at least a portion of the first plate, a display panel, at least a portion of which is viewable through the window, a PCB disposed between the display panel and the second plate, a rear structure disposed between the PCB and the second plate, coupled to or integrated with the side member, and including a first area and a second area that are adjacent to the first edge, an antenna structure disposed on the rear structure, wherein the antenna includes a conductive pattern including a first point, a second point, and a third point, wherein the conductive layer includes a first conductive pattern extending in a first direction that is parallel to the first edge while having a first length from the first point, disposed to surround at least a portion of the first area, and including the second point, a second conductive pattern extending in a second direction that is opposite to the first direction while having a second length that is smaller than the first length from the first point, and including the third point electrically connected to a ground of the PCB, and a third conductive pattern disposed in the first area, having a third length that is smaller than the first length from the first point, and disposed to generate coupling with at least a portion of the first conductive pattern, a first switching circuit disposed on a path between the second point and the ground, and a wireless communication circuit electrically connected to the conductive pattern, and that transmits and/or receives a first signal of a first frequency range and a second signal of a second frequency range that is higher than the first frequency range, In an embodiment, the wireless communication circuit may transmit and/or receive a signal having a first resonance frequency in the second frequency range by using the second conductive pattern, and transmit and/or receive a signal having a second resonance frequency that is different from the first resonance frequency in the second frequency range by using the third conductive pattern.

In an embodiment, the first conductive pattern may include a part between the first point and the second point, and the first area may be located between the part of the first conductive pattern and the first edge.

In an embodiment, the first switching circuit may electrically connect the second point to the ground through a plurality of elements including a first element and a second element.

In an embodiment, when the first switching circuit electrically connects the second point to the ground through the first element, the wireless communication circuit may transmit and/or receive signals of a first resonance frequency in the first frequency range, and when the first switching circuit electrically connects the second point to the ground through the second element, the wireless communication circuit may transmit and/or receive signals of a second resonance frequency that is different from the first resonance frequency in the first frequency range.

In an embodiment, a first distal end of the first conductive pattern, a second distal end of the second conductive pattern, and a third distal end of the third conductive pattern may be located to be spaced apart from the first edge.

In an embodiment, the first conductive pattern may include a first part spaced apart from the first edge by a first interval and includes the first point, and a second part spaced apart from the first edge by a second interval that is smaller than the first interval, and includes the first distal end, and the third conductive pattern may be disposed between the first edge and the first part.

In an embodiment, at least portions of the first conductive pattern, the second conductive pattern, and the third conductive pattern may be merged into a common portion.

In an embodiment, the electronic device may further include a second switching circuit connecting the third point and the ground.

In an embodiment, the wireless communication circuit may further include a second switching circuit that feeds electric power through the first point and connects the first point and the ground of the PCB.

In an embodiment, the conductive pattern may be made of an FPCB.

An electronic device according to an embodiment of the disclosure includes a housing including a first plate, a second plate facing in a direction opposite to the first plate, and a side member surrounding a space between the first plate and the second plate and including a first edge, a window disposed in at least a portion of the first plate, a display panel, at least a portion of which is viewable through the window, a PCB disposed between the display panel and the second plate, a rear structure disposed between the PCB and the second plate, coupled to or integrated with the side member, and including a first area and a second area that are adjacent to the first edge, an antenna structure disposed on the rear structure, wherein the antenna structure includes a conductive pattern including a first point, a second point, and a third point, wherein the conductive layer includes a first conductive pattern having a first length from the first point, extending in a first direction, and including the second point, a second conductive pattern having a second length that is smaller than the first length from the first point, extending in a second direction that is opposite to the first direction, and including the third point electrically connected to a ground of the PCB, and a third conductive pattern extending from the first point to have a third length that is shorter than the first length, and a wireless communication circuit electrically connected to the first point, and that transmits and/or receives a first signal of a first frequency range and a second signal of a second frequency range that is higher than the first frequency range, a first distal end of the first conductive pattern, a second distal end of the second conductive pattern, and a third distal end of the third conductive pattern may be spaced apart from the first edge, and the first conductive pattern may include a first part spaced apart from the first edge by a first interval, and a second part spaced apart from the first edge by a second interval that is smaller than the first interval, and the third conductive pattern may be disposed in the first area between the first edge and the first part of the first conductive pattern.

In an embodiment, the first edge may include a nonconductive material.

In an embodiment, the electronic device may further include a first switching circuit disposed on a path between the second point that is different from the first point and the ground.

In an embodiment, the third conductive pattern may be disposed between the first point and the second point.

In an embodiment, when the first switching circuit electrically connects the second point to the ground of the PCB through a plurality of elements including a first element and a second element and the first switching circuit electrically connects the second point to the ground through the first element, the electronic device may transmit and/or receive a signal having a first resonance frequency in the first frequency range, and when the first switching circuit electrically connects the second point to the ground through the second element, the electronic device may transmit and/or receive a signal having a second resonance frequency that is different from the first resonance frequency in the first frequency range.

In an embodiment, the electronic device may further include a second switching circuit connecting the third point and the ground.

In an embodiment, the electronic device may transmit and/or receive the first signal by using the first conductive pattern, and may transmit and/or receive the second signal by using the third conductive pattern.

In an embodiment, the electronic device may transmit and/or receive a signal having a first resonance frequency in the second frequency range by using the second conductive pattern, and transmit and/or receive a signal having a second resonance frequency that is different from the first resonance frequency in the second frequency range by using the third conductive pattern.

In an embodiment, the conductive pattern may be made of an FPCB.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a housing including a first plate, a second plate facing in a direction opposite to the first plate, and a side member surrounding a space between the first plate and the second plate and including a first edge;
a window disposed in at least a portion of the first plate;
a display panel, at least a portion of which is viewable through the window;
a PCB disposed between the display panel and the second plate;
a rear structure disposed between the PCB and the second plate, coupled to or integrated with the side member, and including a first area and a second area that are adjacent to the first edge;
an antenna structure disposed on the rear structure,
wherein the antenna structure includes:
a conductive pattern including a first point, a second point, and a third point,
wherein the conductive pattern includes:
a first conductive pattern extending in a first direction that is parallel to the first edge while having a first length from the first point, disposed to surround at least a portion of the first area, and including the second point;
a second conductive pattern extending in a second direction that is opposite to the first direction while having a second length that is smaller than the first length from the first point, and including the third point electrically connected to a ground of the PCB; and
a third conductive pattern disposed in the first area, having a third length that is smaller than the first length from the first point, and disposed to generate coupling with at least a portion of the first conductive pattern; and
a first switching circuit disposed on a path between the second point and the ground; and
a wireless communication circuit electrically connected to the conductive pattern, and configured to transmit and/or receive a first signal of a first frequency range and a second signal of a second frequency range that is higher than the first frequency range.

2. The electronic device of claim 1, wherein the wireless communication circuit transmits and/or receives a third signal having a first resonance frequency in the second frequency range by using the second conductive pattern, and transmits and/or receives a fourth signal having a second resonance frequency that is different from the first resonance frequency in the second frequency range by using the third conductive pattern.

3. The electronic device of claim 1, wherein the first conductive pattern includes a part between the first point and the second point, and
wherein the first area is located between the part of the first conductive pattern and the first edge.

4. The electronic device of claim 1, wherein the first switching circuit electrically connects the second point to the ground through a plurality of elements including a first element and a second element.

5. The electronic device of claim 4, wherein when the first switching circuit electrically connects the second point to the ground through the first element, the wireless communication circuit transmits and/or receives signals of a first resonance frequency in the first frequency range, and wherein when the first switching circuit electrically connects the second point to the ground through the second element, the wireless communication circuit transmits and/or receives signals of a second resonance frequency that is different from the first resonance frequency in the first frequency range.

6. The electronic device of claim 1, wherein a first distal end of the first conductive pattern, a second distal end of the second conductive pattern, and a third distal end of the third conductive pattern are located to be spaced apart from the first edge.

7. The electronic device of claim 6, wherein the first conductive pattern includes a first part spaced apart from the first edge by a first interval and includes the first point, and a second part spaced apart from the first edge by a second interval that is smaller than the first interval and includes the first distal end, and wherein the third conductive pattern is disposed between the first edge and the first part.

8. The electronic device of claim 1, wherein at least portions of the first conductive pattern, the second conductive pattern, and the third conductive pattern are merged into a common portion.

9. The electronic device of claim 1, further comprising:
a second switching circuit connecting the third point and the ground.

10. The electronic device of claim 1, wherein the wireless communication circuit feeds electric power to the first point, and wherein the electronic device further includes a second switching circuit connecting the first point and the ground of the PCB.

11. The electronic device of claim 1, wherein the conductive pattern is made of a flexible printed circuit board (FPCB).

12. An electronic device comprising:
a housing including a first plate, a second plate facing in a direction opposite to the first plate, and a side member surrounding a space between the first plate and the second plate and including a first edge;
a window disposed in at least a portion of the first plate;
a display panel, at least a portion of which is viewable through the window;
a PCB disposed between the display panel and the second plate;
a rear structure disposed between the PCB and the second plate, coupled to or integrated with the side member, and including a first area and a second area that are adjacent to the first edge;
an antenna structure disposed on the rear structure,
wherein the antenna structure includes:
a conductive pattern including a first point, a second point, and a third point,
wherein the conductive pattern includes:
a first conductive pattern having a first length and extending from the first point in a first direction, and including the second point, wherein the first point and second point are electrically connected;
a second conductive pattern having a second length that is smaller than the first length and extending from the first point in a second direction that is opposite to the first direction, and including the third point electrically connected to a ground of the PCB; and
a third conductive pattern extending from the first point to have a third length that is shorter than the first length; and
a wireless communication circuit electrically connected to the first point, and configured to transmit and/or receive a first signal of a first frequency range and a second signal of a second frequency range that is higher than the first frequency range,
wherein a first distal end of the first conductive pattern, a second distal end of the second conductive pattern, and a third distal end of the third conductive pattern are located to be spaced apart from the first edge,
wherein the first conductive pattern includes a first part spaced apart from the first edge by a first interval, and a second part spaced apart from the first edge by a second interval that is smaller than the first interval, and
wherein the third conductive pattern is disposed in the first area between the first edge and the first part of the first conductive pattern.

13. The electronic device of claim 12, wherein the first edge includes a nonconductive material.

14. The electronic device of claim 12, further comprising:
a first switching circuit disposed on a path between the second point that is different from the first point and the ground.

15. The electronic device of claim 14, wherein the third conductive pattern is disposed between the first point and the second point.

16. The electronic device of claim 12, wherein the first point is a feeding point.

17. The electronic device of claim 12, wherein the third conductive pattern floats.

18. The electronic device of claim 12, wherein the first conductive pattern or the second conductive pattern are configured to selectively float.

* * * * *